United States Patent [19]
Yan

[11] Patent Number: 5,657,220
[45] Date of Patent: Aug. 12, 1997

[54] ELECTRICAL POWER INVERTER

[75] Inventor: Cheng Chung Yan, Kowloon, Hong Kong

[73] Assignee: Astec International, Ltd., Hong Kong, Hong Kong

[21] Appl. No.: 566,913

[22] Filed: Dec. 4, 1995

[51] Int. Cl.$^6$ .................................................. H02M 7/537
[52] U.S. Cl. ................................................... 363/132
[58] Field of Search ....................... 363/35, 37, 95–96, 363/98, 132, 137, 84; 323/271, 272, 282, 283, 284; 320/29

[56] References Cited

U.S. PATENT DOCUMENTS

| | | | |
|---|---|---|---|
| 4,941,079 | 7/1990 | Ooi | 363/132 |
| 5,297,015 | 3/1994 | Miyazaki et al. | 363/146 |

*Primary Examiner*—Aditya Krishnan
*Attorney, Agent, or Firm*—Coudert Brothers

[57] ABSTRACT

An electrical power inverter with a controllable output voltage waveform is disclosed. In a preferred embodiment, the electrical power inverter has a trapezoidal output voltage waveform with rising and falling edges that are controlled such that their slopes are kept below a selected value.

21 Claims, 6 Drawing Sheets

ELECTRICAL POWER INVERTER

FIELD OF THE INVENTION

The present invention relates generally to electrical power converters, and more particularly to a switching mode power inverter wherein the shape of the output voltage waveform is controlled.

BACKGROUND OF THE INVENTION

An electrical power converter is a device for processing electrical power from one form into another form that meets the requirements of an electrical system. Electrical power converters commonly are used to change alternating-current (AC) power to direct current (DC) power or vice versa, or to change one DC voltage level to another. A power converter that changes DC power to AC power is commonly referred to as an "inverter." A variety of circuit topologies are used as the basis for power converters, including the well-known topologies referred to as buck, boost, buck-boost, push-pull, full bridge, half-bridge and forward converters.

In many power converters, a switching regulator regulates the output signal of the converter by varying the amount of time that electrical energy is coupled through a power switch from the converter's input to a power transformer within the power converter, the output of the power transformer being filtered to produce an output voltage. The regulation process commonly is performed by a pulse width modulator that is responsive to the output voltage of the power converter. The pulse width modulator controls the amount of time the power switch is ON (i.e., electrical energy, in the form of voltage and current are enabled to couple through the switch), thereby determining the pulse width of the current and voltage pulses coupled from the input of the converter. The pulse width (sometimes called length) of the input voltage pulses (as well as the shape of input current pulses) in turn affects the characteristics of the output voltage.

Figure 1:
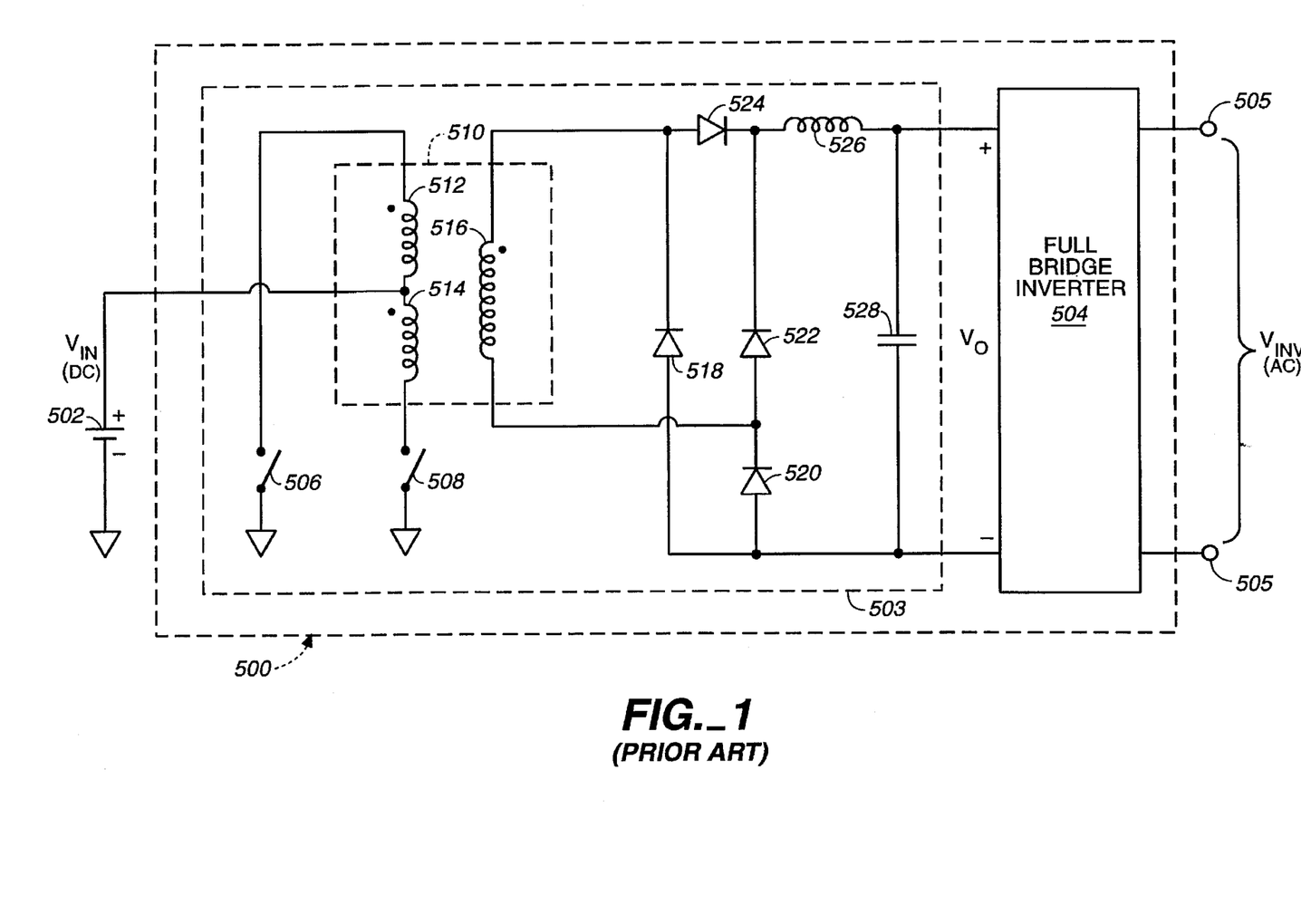
FIG. 1 is a circuit diagram of a prior art power converter.

An example of a typical prior art high frequency switching mode power inverter 500 is shown in FIG. 1. The illustrated inverter produces a rectangular AC output waveform $V_{inv}$ with sharp rising and falling edges. Power inverter 500 has two stages. The first stage is a power converter 503 which converts a low DC input voltage $V_{in}$ from a battery 502 into an output DC high voltage, $V_o$ across an output capacitor 528. This DC voltage $V_o$ is chopped to produce an AC output voltage $V_{INV}$ by inverting the DC voltage $V_o$ during alternate voltage half-cycles of $V_{INV}$ by a second stage full bridge inverter 504. Bridge inverter 504 is typically switched at a 50 Hz or 60 Hz rate to produce an output AC voltage $V_{inv}$ at output terminals 505. Those skilled in the art will recognize that power converter 503 is a push-pull converter which utilizes the following conventional components: primary switches 506 and 508, a power transformer 510 having primary windings 512 and 514 and a secondary winding 516, output rectifiers 518, 520, 522 and 524, output choke 526, and output capacitor 528. Switches 506 and 508 are controlled by a conventional pulse width modulator circuit (not shown).

The characteristics of the output voltage waveform of a power inverter are often important to the performance of the load device and for the power inverter to meet standard specifications. For example, it is generally important to regulate the RMS value of the output power, voltage, and/or current. As another example, many simple off-line uninterruptable power supplies ("UPS's"), which draw DC input power from a battery, are designed to produce a rectangular or trapezoidal AC output voltage, instead of the customary sinusoidal AC output. UPS's often are also required to have waveforms with rising and falling edges of less than 10 volts/microsecond.

The reasons for these requirements are well-known and relate to efficient battery utilization and control of electrical noise. More specifically, for a simple off-line UPS, the shape of the output current waveform is nearly the same as the shape of the input current waveform. Both current waveforms are related to the shape of the output voltage waveform. If the output voltage of the off-line UPS is sinusoidal, for example, both the output current and input (battery) current waveforms consist of relatively sharp peaks near the center of each voltage half cycle, with the value of the input current peak being much greater than the value of the output current peak. By contrast, if the output voltage of the off-line UPS has a rectangular or trapezoidal waveform, the output current and battery current waveforms approximate these voltage waveforms.

Given the same output power being generated by a battery powered UPS, the peak input current that is required in order to generate a sinusoidal output voltage is much higher than the peak input current in the case of a trapezoidal output voltage. As is well known, this higher peak current for a sinusoidal output voltage places greater stress on the battery side of the power converter and results in the usable percentage of battery capacity being lower for a sinusoidal output off-line UPS than for a rectangular or trapezoidal output UPS. For this reason, in simple off-line UPS designs, rectangular or trapezoidal wave outputs are generally preferred.

However, when a UPS having a rectangular or trapezoidal AC output with a sharp rising edge (slope>>10 V/μs) is used to drive a typical load, its output current will have a high leading current spike at the beginning of each voltage half cycle. This high current spike will generate noise, which will sometimes interfere with the normal operation of the device being powered, such as a computer or computer monitor. For this reason, it is desirable for UPS's to have an output voltage rising edge slope of less than 10 V/μs. For similar reasons, it may be important to keep the falling edge slope below a certain value. Most simple types of UPSs have output voltage waveforms with sharp rising and falling edges.

Accordingly, there is a need for an electrical power inverter having a trapezoidal output voltage waveform and rising and/or falling edges that are kept below a certain slope value.

SUMMARY OF THE INVENTION

Broadly stated, the present invention encompasses an electrical power inverter wherein the shape of the output voltage waveform is controllable. In a preferred embodiment, the present invention encompasses an electrical power inverter having a trapezoidal output voltage waveform with rising and/or falling edges that are controlled such that their slopes are kept below a selected value.

In a preferred embodiment, the present invention is an electrical power converter for generating an output voltage from an input DC voltage, said output voltage having a periodic substantially trapezoidal waveform shape, comprising an input port for receiving a DC voltage source and an output port for providing said trapezoidal wave output voltage to a load; a power conversion means for generating said trapezoidal wave output voltage at said output port from said input voltage, said power conversion means having an energy storage means coupled to said output port for storing energy at said output port and for generating said output voltage as a function of the amount of said stored energy, and an energy coupling means for coupling energy from said input port to said output port in amounts needed to supply energy to the load and to enable said energy storage means to generate said trapezoidal wave output voltage; and a power conversion control means for causing said output voltage to vary at a selected output frequency, wherein said output voltage periodically increases from a value of substantially zero volts to a selected voltage, remains substantially at said selected voltage for a controlled period of time, and subsequently decreases to a value of substantially zero volts, said power conversion control means including a voltage increase control means for controlling the rate at which energy is coupled to said output port such that the rate of said increase in said output voltage is maintained below a selected value.

The voltage increase control means keeps the rising edge slope of the output voltage waveform below a selected value preferably by using a soft start circuit.

The power inverter according to the present invention also preferably further comprises a voltage decrease control means that keeps the falling edge slope of the output voltage waveform below a selected value. The voltage decrease control means preferably includes a current limiter circuit.

An object of the present invention is, therefore, to provide an electrical power inverter having a trapezoidal output voltage waveform shape with a rising edge slope of less than 10 volts per microsecond.

Another object of the present invention is to provide an electrical power inverter having a trapezoidal output voltage waveform with a falling edge slope of less than 10 volts per microsecond.

Yet another object of the present invention is to provide an electrical power inverter with a trapezoidal output voltage waveform when the inverter is providing power to an inductive, light resistive load, heavy resistive load or typical computer load.

A further object of the present invention is to provide an electrical power inverter having a trapezoidal output voltage waveform with controllable rising and falling edge slopes.

Still another object of the present invention is to provide a power inverter wherein RMS regulation of the output voltage is obtained by modulating the high frequency conversion front stage rather than the full bridge output stage of the inverter.

A still further object of the present invention is to provide a power inverter having a trapezoidal shaped output voltage waveform and a low component count.

These and other objects of the present invention will become apparent to those skilled in the art from the following detailed description of the invention and preferred embodiments, the accompanying drawings, and the appended claims.

DETAILED DESCRIPTION

Figures 2, 2B:
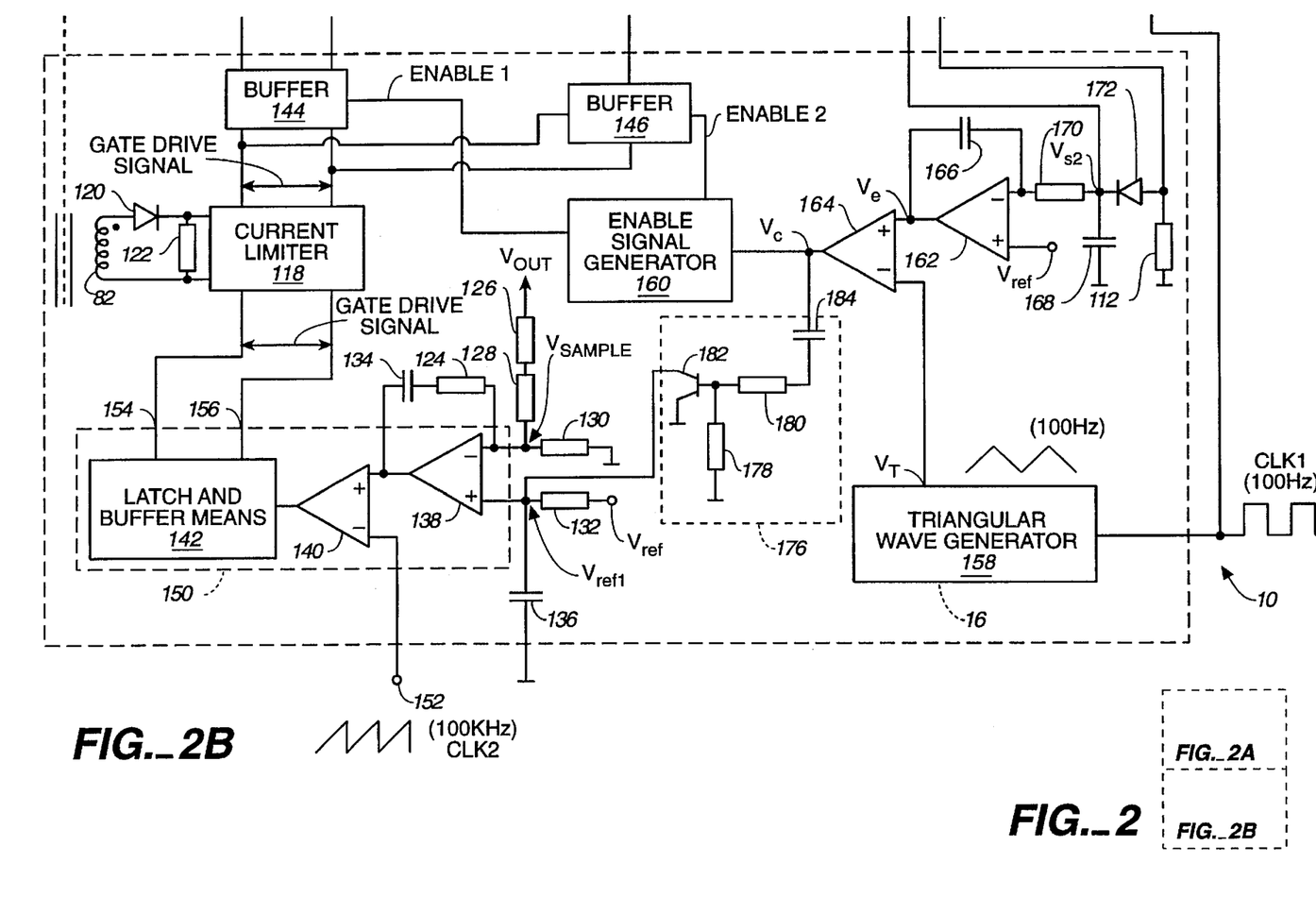
FIG. 2 is a combined block and circuit diagram of one embodiment of an electrical power converter according to the present invention.
Figure 2A:
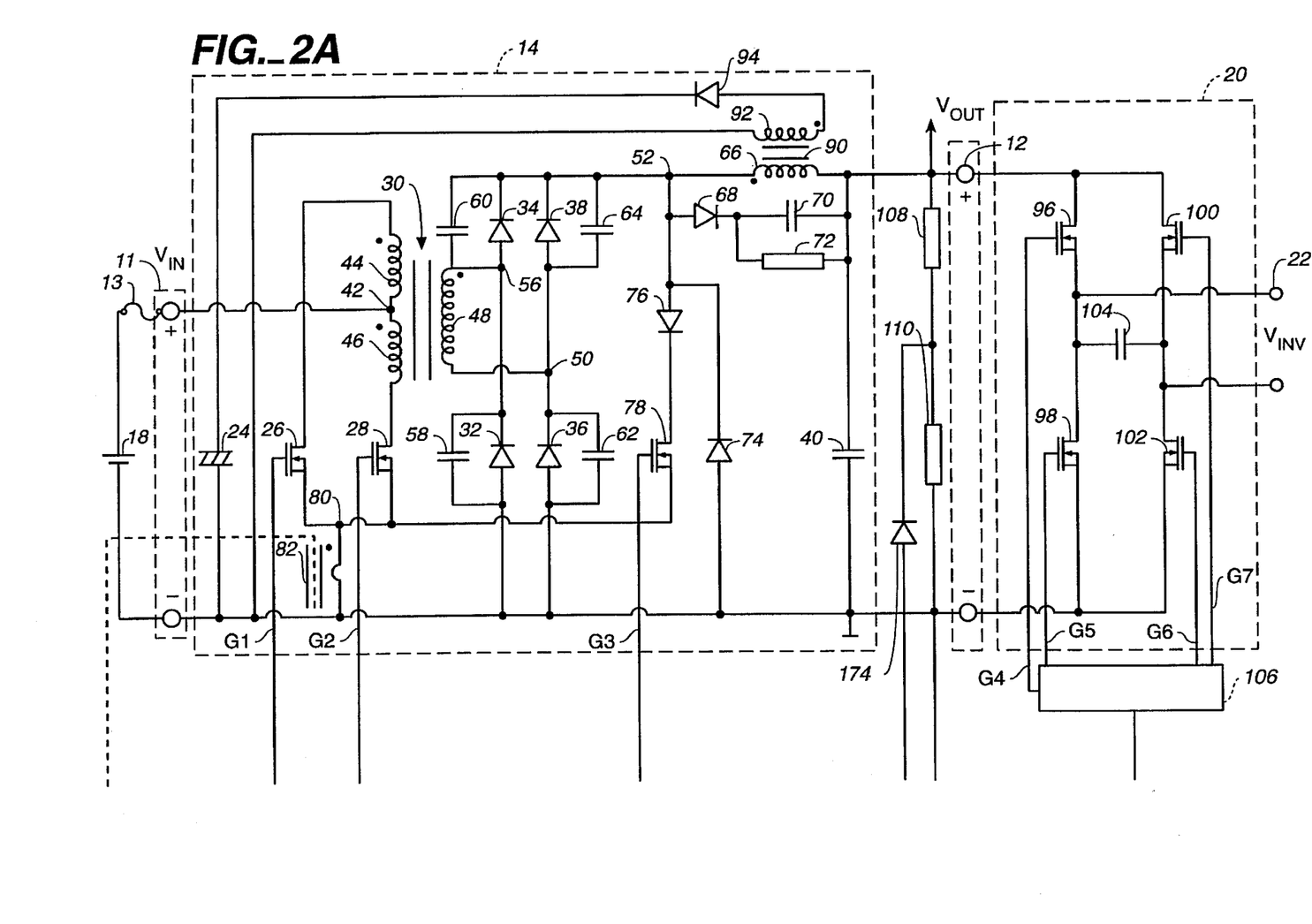

An electrical power inverter according to the present invention is shown at 10 in FIG. 2. Electrical power inverter 10 is designed to produce an AC trapezoidal output voltage from a DC input voltage. The rising and falling edges of the output voltage waveform are controllable. In addition, the RMS value of the output voltage is controlled by modulating the duty cycle of the low frequency envelope of the high frequency conversion front stage comprising power conversion means 14, rather than by controlling the duty cycle of the full bridge output stage, comprising bridge inverter 20. Electrical power inverter 10 is preferably used as an off-line UPS.

Electrical power inverter 10 receives a substantially DC input voltage $V_{in}$ at input port 11, preferably from a battery 18. Power conversion means 14 of electrical power inverter 10 converts input voltage $V_{in}$ to an output voltage $V_{out}$ at output port 12. Power conversion control means 16 controls power conversion means 14 such that output voltage $V_{out}$ has an output voltage waveform that increases from a value of substantially zero volts to a voltage $V_{peak}$, remains substantially at $V_{peak}$ for a period of time and subsequently decreases to a value of substantially zero volts during each cycle. Such cycles repeat at an output frequency $F_{out}$. Output voltage $V_{out}$ preferably has a substantially trapezoidal DC waveform with a frequency of approximately 100 Hz. A bridge inverter 20 is preferably coupled between output port 12 and a load port 22 to invert output voltage $V_{out}$ during alternate voltage cycles, in a conventional manner, and thereby produce a 50 Hz AC trapezoidal voltage $V_{inv}$ at load port 22.

As will be explained further below, power conversion control means 16 controls power conversion means 14 such that the slopes of the rising and falling edges of the output voltage waveform are kept below a selected value, preferably 10 volts per microsecond. Thus, electrical power inverter 10 is suitable for use in an off-line uninterruptable power supply. Power conversion control means 16 also controls the RMS value of the output voltage.

Turning now to a more detailed description of power conversion means 14, power conversion means 14 preferably comprises a push-pull power converter having an input capacitor 24, power switches 26 and 28, power transformer 30, output rectifiers 32, 34, 36 and 38, and output capacitor 40. In operation, input voltage $V_{in}$ is stored on capacitor 24. Power switches 26 and 28 alternately couple input voltage $V_{in}$ across two primary windings 44 and 46 of power transformer 30 in the form of voltage pulses, generating corresponding voltage pulses across the secondary winding 48 of power transformer 30 due to transformer action. Switches 26 and 28 are operated at a relatively high frequency (e.g., 50–100 kHz), yielding voltage pulses on the secondary winding 48 of power transformer 30 at a frequency of the same order of magnitude. These secondary voltage pulses are rectified and filtered to produce an output voltage $V_{out}$ on capacitor 40.

More specifically, input capacitor 24 is coupled across input port 11 and one end of capacitor 24 is coupled to power transformer 30 at a node 42, the center tap between primary windings 44 and 46. Primary winding 44 is coupled between node 42 and power switch 26 such that when power switch 26 is in its ON state input voltage $V_{in}$ is coupled across primary winding 44. Primary winding 46 is coupled between node 42 and power switch 28 such that when power switch 28 is in its ON state input voltage $V_{in}$ is coupled across primary winding 46. The other side of power switch 26 and power switch 28 are coupled in common to a node 80.

The series of voltage pulses generated across secondary winding 48, as a result of the coupling of $V_{in}$ across windings 44 and 46, is rectified by rectifiers 32 through 38 and filtered by capacitor 40 to produce output voltage $V_{out}$. More specifically, when a positive input voltage $V_{in}$ is coupled across primary winding 44 (positive from the "+" terminal to the "−" terminal of input port 11), a positive voltage is induced at the undotted side of secondary winding 48 such that an electrical current is conducted from the negative terminal of output port 12 (indicated with a "−" sign) through rectifier 32, secondary winding 48, a node 50, rectifier 38, and a node 52 to capacitor 40 and the positive terminal (indicated with a "+" sign) of output port 12. When input voltage $V_{in}$ is coupled across primary winding 46, a positive voltage is induced at the dotted side of secondary winding 48 such that electrical current is conducted from the negative terminal of output port 12 through rectifier 36, node 50, secondary winding 48, node 56 and rectifier 34 to capacitor 40 and the positive terminal of output port 12.

A primary winding 66 of a transformer 90 is preferably coupled between node 52 and the positive terminal of output port 12 to help filter the voltage coupled to output port 12. A conventional snubber/clamper circuit consisting of a diode 68 in series with a parallel coupled capacitor 70 and resistor 72 is preferably coupled across winding 66. Similarly, capacitors 58, 60, 62 and 64 are conventional snubber/clamper circuits and are preferably coupled from the cathode to the anode of, respectively, rectifiers 32, 34, 36 and 38. Rectifier 74 is coupled between the negative terminal of output port 12 and node 52 such that current is enabled to be conducted through rectifier 74 substantially only in the direction to node 52. A rectifier 76 and a secondary switch 78 are coupled in series between node 52 and node 80 such that electrical current is enabled to be conducted through rectifier 76 and secondary switch 78 substantially only in the direction from node 52 to node 80 and only when secondary switch 78 is in its ON state. A control transformer 82 is coupled between node 80 and the negative terminals of both input port 11 and output port 12.

Power conversion means 14 also preferably includes an energy return mechanism comprising a secondary winding 92 of transformer 90. A positive voltage applied at the dotted terminal of winding 66 produces a positive voltage at the dotted terminal of winding 92. A rectifier 94 is coupled between the dotted terminal of winding 92 and the positive terminal of input port 11. The undotted end of winding 92 is coupled to the negative terminal of input port 11. When the voltage at the dotted terminal of winding 92 is sufficiently positive, electrical current will be conducted through rectifier 94 to capacitor 24. Otherwise, no current will be conducted through rectifier 94.

Power conversion control means 16, which is described in more detail below, controls power conversion means 14 by controlling switches 26, 28 and 78 using control signals $G_1$, $G_2$ and $G_3$, respectively. Power conversion control means 16 causes output voltage $V_{out}$ to periodically rise to a peak voltage and subsequently decrease to about zero volts to create a low frequency (e.g., 100 Hz) DC trapezoidal wave. Power conversion control means 16 is responsive to a 100 Hz CLK1 signal and a 100 kHz CLK2 signal. Power conversion control means 16 is also responsive to $V_{out}$, which is sensed in a conventional manner by a voltage divider consisting of resistors 108, 110 and 112.

Turning now to bridge inverter 20, bridge inverter 20 has four switches 96, 98, 100 and 102, and a capacitor 104 which are configured in a conventional manner. The above-described CLK1 signal is also used by a bridge inverter controller 106 in a conventional manner to drive bridge inverter 20. Switches 96–102 are controlled by bridge inverter controller 106 in a manner such that the DC trapezoidal output voltage $V_{out}$ is periodically inverted during alternate voltage cycles to produce the 50 Hz AC trapezoidal voltage $V_{inv}$ at load port 22. Bridge inverter controller 106 preferably is a conventional gate drive generator, having a delay circuit, frequency driver, logic inverter and buffer. Aside from inverting alternate voltage half cycles, bridge inverter 20 does not alter the shape of each trapezoidal cycle of output voltage $V_{out}$. The operation of bridge inverter 20 and bridge inverter controller 106 will be understood by those skilled in the art.

Based on the present description, those skilled in the art will appreciate that a wide variety of component types and values are possible for the components of electrical power converter 10. Certain component types and values, however, are preferable. Power transformer 30 is preferably a ferrite core transformer. Transformer 90 is preferably an iron powder core transformer. Power switches 26 and 28 are low voltage MOSFETs (herein referred to as FETs), preferably 50 V FETs, switch 78 is a high voltage FET, preferably an 800 V FET. Switches 96, 98, 100 and 102 are preferably 400–500 V FETs in the case of a 230 V RMS output. Rectifiers 32–38 and 74 preferably are high voltage fast recovery rectifiers. Capacitor 24 preferably is low voltage electrolytic capacitor and capacitor 40 is high voltage polyester capacitor. Power converter 10 preferably has a fuse 13.

For a 250 VA off-line UPS with a 230 V RMS trapezoidal output using the circuit shown in FIG. 2, the following exemplary component values may be used:

| ITEM | COMPONENT DESCRIPTION AND VALUE |
| --- | --- |
| Capacitor 24 | Electrolytic capacitor 470 μF 16V (3pcs) |
| Capacitors 58–64 | Ceramic capacitor 100pF 1KV |
| Capacitor 70 | Ceramic capacitor 10nF 500V |
| Capacitor 40 | Polyester capacitor 1 μF 400V |
| Capacitor 104 | 'X' capacitor 0.1 μF 250V |
| Rectifier 76 | ULTRA FAST RECOVERY RECT. 2A 50V |
| Rectifiers 32–38 | ULTRA FAST RECOVERY RECT. 2.3a 600V |
| Rectifier 68 | VERY FAST RECOVERY RECT. 1A 800V |
| Rectifier 74 | VERY FAST RECOVERY RECT. 2.3A 1kV |
| Rectifier 94 | VERY FAST RECOVERY RECT. 3A 50V |
| Switches 26 and 28 | MOSFET 48A 60V |
| Switch 78 | MOSFET 4A1kV |
| Switches 96–102 | MOSFET 4.5A 500V |
| Resistor 72 | RES. 56K 2W (2pcs) |
| Battery 18 | Lead acid battery 12V 7AH |
| Fuse 13 | DC fuse 125V 30A |
| Transformer 90 | Iron power core choke T92-52 0.2mH |
| Transformer 30 | Ferrite core transformer ETD34 |
| Transformer 82 | Current sense transformer 1:300turns |

In operation, power conversion means 14 and bridge inverter 20 function as a power inverter having two stages. The front stage of the power inverter (power conversion means 14) is a high frequency, (e.g. 100 kHz) push-pull converter. The output stage of the power inverter (bridge inverter 20) is a low frequency, (e.g. 50 Hz) full bridge inverter. Power inverter 10 is preferably fed by a low input voltage, such as 12 V DC, which in UPS applications is typically provided by a battery 18. Under the control of power conversion control means 16, the front stage converts this low input voltage to a 100 Hz high voltage DC trapezoidal wave across capacitor 40, as explained further below. The output stage then converts this DC trapezoidal wave to a 50 Hz AC trapezoidal wave at the output of the inverter, preferably at 230 V RMS.

Figure 3A:
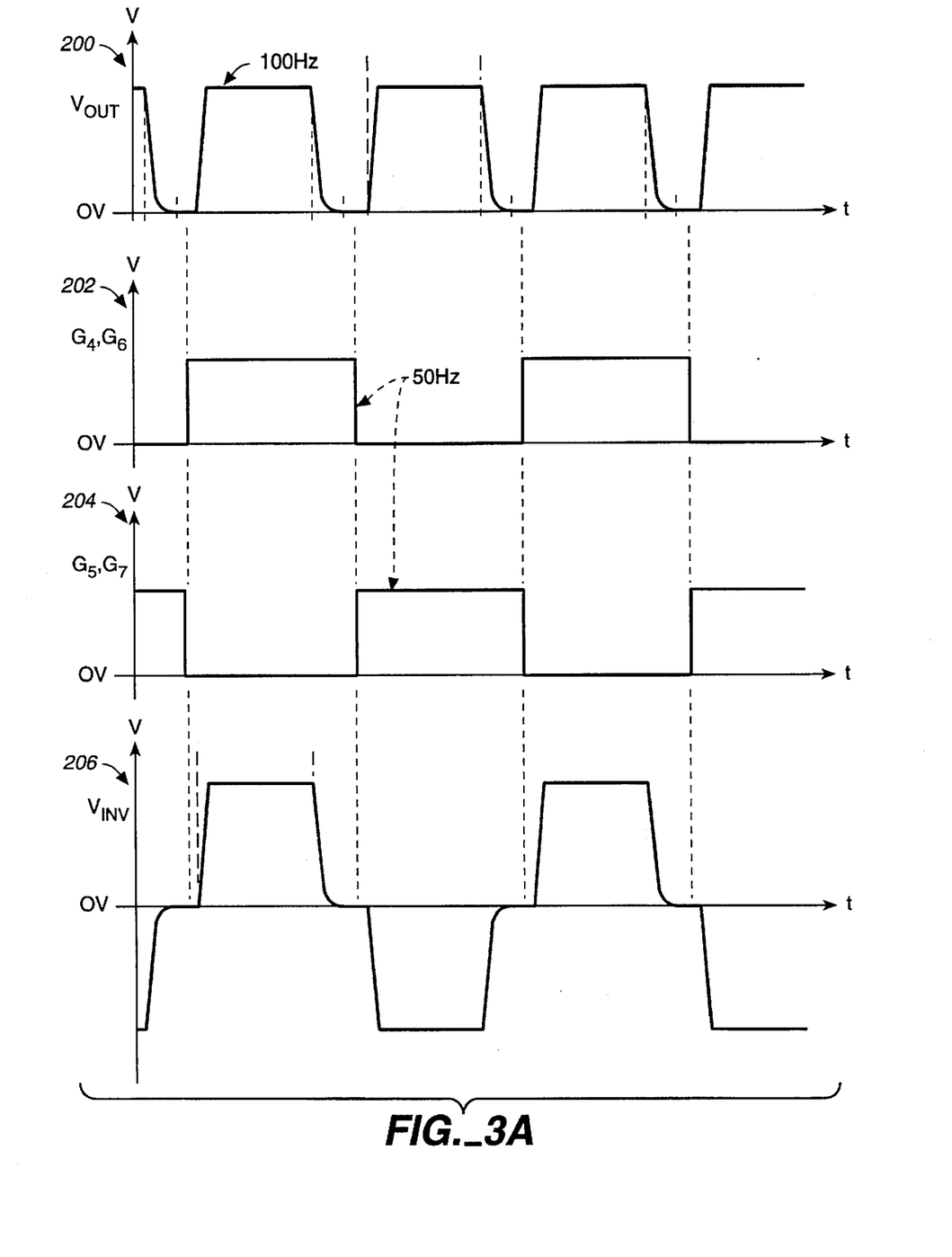
FIGS. 3A and 3B are timing diagrams showing key voltages and currents of the electrical power converter shown in FIG. 2.

The basic operation of electrical power inverter 10 is illustrated in FIG. 3A. FIG. 3A includes four timing diagrams: timing diagrams 200, 202, 204 and 206. Timing diagram 200 shows the value of $V_{out}$ during several periods. As illustrated, $V_{out}$ has a roughly trapezoidal waveform. As explained above, output voltage $V_{out}$ preferably has a frequency of 100 Hz.

Timing diagram 202 shows the value of gate drive signal voltages $G_4$ and $G_6$, which are produced by power inverter controller 106 to control switches 96 and 102, respectively. As illustrated, switches 96 and 102 are simultaneously mined on and off with a frequency of 50 Hz, thereby coupling alternate cycles of the output voltage $V_{out}$ to port 22.

Timing diagram 204 shows the value of gate drive signal voltages $G_5$ and $G_7$, which are produced by bridge inverter controller 106 to control switches and 98 and 100, respectively. As illustrated, switches 98 and 100 are simultaneously turned on and off at a frequency of 50 Hz, thereby inverting alternate cycles of output voltage $V_{out}$ and coupling this inverted voltage to port 22. The voltage $V_{inv}$ at port 22 is, therefore, similar to output voltage $V_{out}$, with alternate voltage half cycles being inverted, as shown in timing diagram 206.

Turning now to a more detailed description of power conversion control means 16, power conversion control means 16 preferably uses a soft-start circuit to control the rising edge of $V_{out}$ and a current limiting circuit to control the failing edge of $V_{out}$. These results are accomplished by controlling the high frequency switching of power switches 26 and 28, and switch 78. Power conversion control means 16 also regulates the RMS value of the low frequency output voltage. This result is accomplished by controlling the relative time periods daring which switches 26, 28 and 78 are permitted to switch on and off, as described in more detail below.

The current limiting and soft-start functions of power conversion control means 16 are performed by a first control circuit comprising current limiter 118, diode 120, transformer 82, resistors 122–132, capacitors 134–136, error amplifier 138, comparator 140, a conventional latch and buffer means 142, and conventional buffers 144–146.

To control the rising edge of $V_{out}$, this first control circuit samples $V_{out}$ by means of the voltage divider comprising resistors 126–130 and produces $V_{samples}$, a scaled-down representation of $V_{out}$. Pulse width modulator circuit 150 comprises error amplifier 138, comparator 140, and a latch and buffer means 142. Amplifier 138 compares this scaled-down version of output voltage $V_{out}$ with a soft-start reference voltage $V_{refl}$, which rises from a relatively low value to a selected reference voltage $V_{ref}$ at the beginning of each cycle of output voltage $V_{out}$ to generate a signal fed to one input of comparator 140. Capacitor 134 and resistor 124 are coupled as a conventional feedback circuit in series between the output of amplifier 138 and the inverting input of amplifier 138.

Soft-start reference voltage $V_{refl}$ preferably is produced using a conventional soft-start circuit as shown in FIG. 2, comprising a series combination of a resistor 132 and a capacitor 136 coupled between reference voltage $V_{ref}$ and ground and means for reducing the value of soft-start reference voltage $V_{refl}$ to approximately ground before the beginning of each cycle of output voltage $V_{out}$. In the illustrated soft-start circuit, at the beginning of each 100 Hz cycle of output voltage $V_{out}$, current is conducted from $V_{ref}$ through resistor 132 to capacitor 136 such that the voltage $V_{refl}$ on capacitor 136 rises until it reaches $V_{ref}$. As will be explained below, the voltage on capacitor 136 is reduced to zero in between cycles of output voltage $V_{out}$.

Utilizing a high frequency (e.g., 100 kHz) CLK2 signal 152 fed to the other input of comparator 140, pulse width modulator 150 produces conventional push-pull 50 kHz gate drive signals at outputs 154 and 156 via the latch and buffer means 142. These gate drive signals are coupled through current limiter 118 and buffer 144 to power switches 26 and 28. It will be appreciated by those skilled in the art that a conventional pulse width modulator circuit may be used for this purpose.

Due to the soft-start circuit, the high frequency push-pull gate drive signals generated at outputs 154 and 156 cause switches 26 and 28 to begin operating at relatively low duty cycle. The duty cycle of switches 26 and 28 increases as soft-start reference voltage $V_{refl}$ increases and is enabled to reach a maximum duty cycle when $V_{refl} = V_{ref}$. This controlled increase, in duty cycle occurs at the beginning of each 100 Hz cycle of output voltage $V_{out}$. Thus, the slope of the rising edge of each cycle of output voltage $V_{out}$ is controlled by the values of the RC circuit comprising resistor 132 and capacitor 136, which governs the rate at which soft-start reference voltage $V_{refl}$ rises. By selecting appropriate values for resistor 132 and capacitor 136, the slope of the rising edge of each 100 Hz output voltage cycle can be regulated and kept below a selected value.

As explained above, the gate drive signals produced at outputs 154 and 156 of pulse width modulator 150 are coupled through a current limiter 118 and buffer 144 to power switches 26 and 28. These gate drive signals are also coupled through current limiter 118 and buffer 146 to switch 78. In a conventional manner, current limiter 118 senses the value of the current through power switch 26, power switch 28, or switch 78 by sensing the voltage across a current sensing resistor 122, which is coupled in series with rectifier 120 and the secondary winding of transformer 82. Using current limiter 118, the peak current through transistors 26 and 28 can be controlled in a manner known in the art. The peak value of the output voltage $V_{out}$ is controlled by the pulse width modulator 150 but not the current limiter 118 during no load or very light load conditions. During heavy load or full load conditions, the pulse width modulator 150 does not substantially affect the peak output voltage.

Current limiter 118 can also be used to control the falling edge slope of output voltage $V_{out}$. This can be accomplished because the gate drive signals from pulse width modulator 150 are also coupled to switch 78 through current limiter 118 and buffer 146, and current limiter 118 also senses the value of the current through switch 78 by means of transformer 82. During the falling edge of each voltage cycle of output voltage $V_{out}$, capacitor 40 is enabled to discharge through switch 78. Current limiter 118 can be used in a conventional manner to control the maximum current through switch 78, thereby controlling the rate at which capacitor 40 discharges.

As is well-known, there are many methods for performing pulse-by-pulse current limiting. The working principle of a current limiter is that, when the current through a power switch reaches the preset current limit, the power switch is mined OFF during the remainder of the switch's duty cycle. The power switch is mined ON again when the next cycle starts. Therefore, the maximum current through the power switch is controlled.

According to the present invention, current limiter 118 provides a first current limit value when either power switch 26 or 28 are on, to provide conventional current limit protection for these switches. When switch 78 is periodically mined on to generate the falling edge of each voltage cycle of $V_{out}$, the effective resistance of resistor 122 is caused to go up in a conventional manner known in the art, to thereby selectively ramp down the amount of current flowing through switch 78, and thus control the slope of this falling edge.

Regulation of the RMS value of $V_{out}$ is performed by a second control circuit comprising a triangular wave generator 158, an enable signal genera–or 160, an error amplifier 162, a comparator 164, capacitors 166–168, resistors 108–112 and 170, diodes 172–174, and a reset circuit 176. Reset circuit 176 comprises resistors 178–180, a switch 182 and a capacitor 184.

This second control circuit samples the value of $V_{out}$ using the voltage divider comprising resistors 108–112 to produce $V_{s2}$, a second scaled-down representation of $V_{out}$, which is stored on capacitor 168. It will be appreciated by those skilled in the art that $V_{s2}$ is a representation of the RMS value of $V_{out}$.

$V_{s2}$ is coupled through resistor 170 to error amplifier 162. Error amplifier 162, with a conventional feedback loop comprising capacitor 166, compares $V_{s2}$ to $V_{ref}$ and amplifies their difference to produce an error voltage $V_e$. Comparator 164 compares error voltage $V_e$ to a 100 Hz triangular wave, produced by conventional triangular wave generator 158, and generates a 100 Hz voltage signal $V_c$ in a conventional manner. Signal $V_c$ controls enable signal generator 160, which controls buffers 144 and 146 and thereby governs the time periods during which gate drive signals are permitted to be coupled through buffers 144 and 146 to switches 26, 28 and 78. In this manner, the RMS value of $V_{out}$ is regulated, as explained further below.

Reset circuit 176 is used to discharge capacitor 136 before switches 26 and 28 are activated at the start of each 100 Hz cycle. This provides the ability for capacitor 136 to be charged slowly through resistor 132 by $V_{ref}$ at the beginning of each cycle. This provides the soft start function during every 100 Hz cycle, as explained above.

Enable Signal Generator 160 takes $V_c$ as its input and produces two enable signals, ENABLE1 and ENABLE2. It will be apparent to those skilled in the art that enable signal generator 160 may be implemented in a conventional manner. The two buffers, Buffer 144 and Buffer 146, are activated by the enable signals. In other words, if an enable signal goes low, the output of the respective buffer goes low also. If the enable signal goes high, the respective buffer is activated and its output is the same as its input. When Buffer 146 is activated, its output is the combined signal of the two push-pull gate drive signals. Therefore, since $G_1$, $G_2$ are preferably 50 kHz gate drive signals, $G_3$ will be a 100 kHz gate drive signal.

Figure 3B:
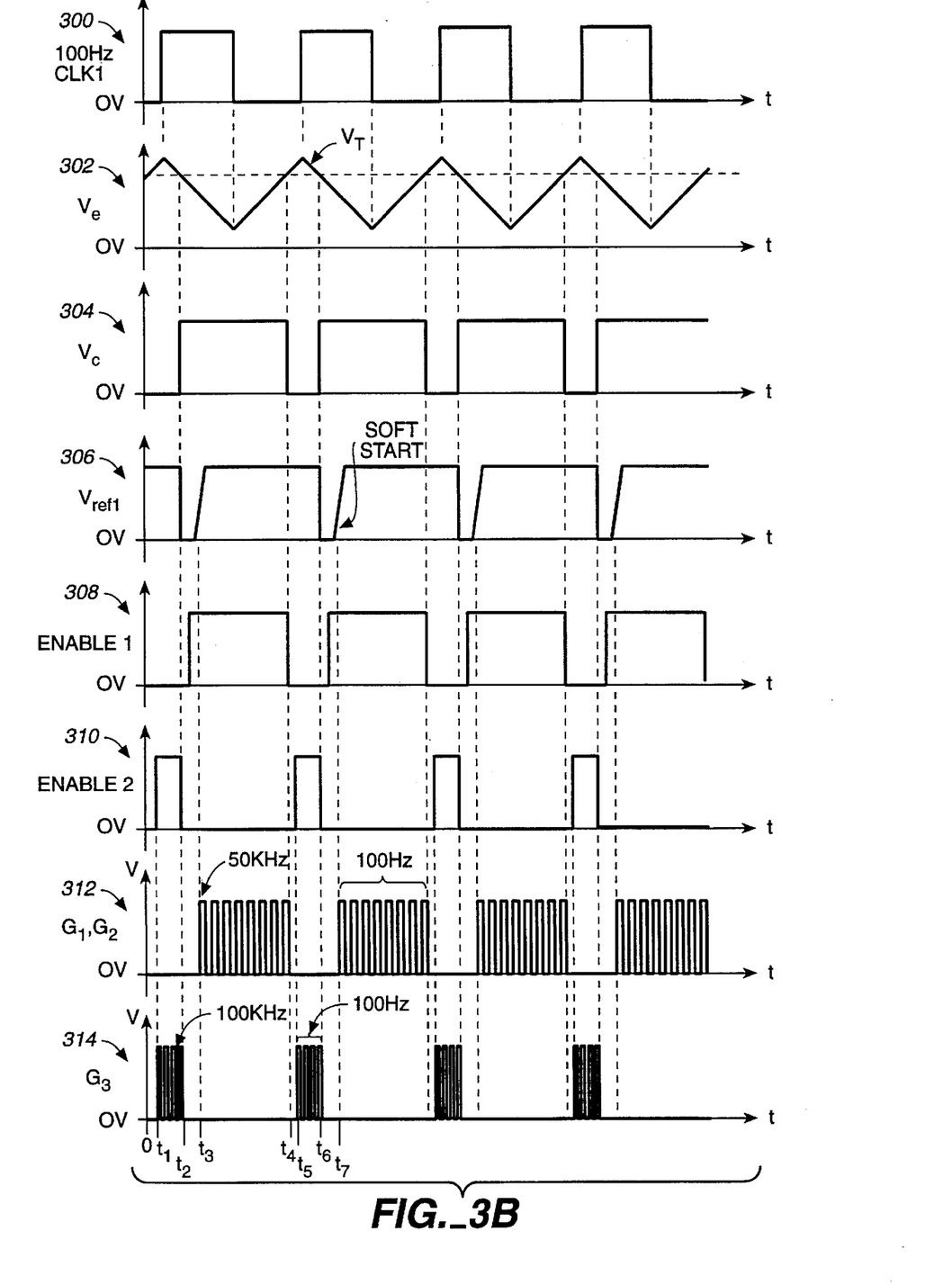

Referring now to FIG. 3B, the manner in which power conversion control means 16 causes power conversion means 14 to produce the output voltage $V_{out}$ with a trapezoidal waveform (as shown in timing diagram 200) will be explained. FIG. 3B contains eight correlated timing diagrams: timing diagrams 300, 302, 304, 306, 308, 310, 312 and 314. These timing diagrams illustrate the functioning of certain components of power converter 10 during several periods of output voltage $V_{out}$.

Power conversion control means generates gate drive signal voltages $G_1$ and $G_2$ to control switches 26 and 28, respectively. During time periods in which switches 26 and 28 are being operated, switches 26 and 28 are alternately turned on and off, thereby alternately coupling input voltage $V_{in}$ across windings 44 and 46 and operating power conversion means 14 as a conventional push-pull inverter. More specifically, referring to timing diagram 312, switches 26 and 28 are activated for a period of time during each cycle of output voltage $V_{out}$ (for example, period $t_3$–$t_4$). During this time, switches 26 and 28 initially charge up capacitor 40 and then continue to maintain a selected voltage on capacitor 40. The rate at which capacitor 40 initially charges is controlled by a soft-start circuit, as explained above. Switches 26 and 28 are then deactivated during other periods, for example, at period $t_4$–$t_7$. It will recognized that, for clarity of the drawing, the 50 kHz signals shown in timing diagram 312 (and the 100 kHz signals shown in diagram 314) are not drawn to scale in relation to the illustrated 100 Hz envelopes defined by the frequency of the CLK1 signal shown in timing diagram 300.

As shown in timing diagram 314, switch 78 is activated at period $t_5$–$t_6$ to discharge capacitor 40. During this time, the energy stored in capacitor 40 is delivered back to the input side by flyback action of transformer 90 through winding 92 and rectifier 94. The rate at which capacitor 40 discharges is controlled by current limiter 118, as explained above. The cycle then repeats. As a result, a 100 Hz trapezoidal wave is formed on capacitor 40.

Note that the 50 kHz push-pull gate drive signals $G_1$ and $G_2$ are modulated by a 100 Hz signal, ENABLE1, as shown in timing diagrams 308 and 312. $G_3$ is a 100 kHz gate drive signal modulated by an opposite phase 100 Hz signal, ENABLE2, as shown in timing diagrams 310 and 314. The width of these 100 Hz envelopes defined by the pulse width of the ENABLE 1 and ENABLE 2 signals is determined by the RMS value of $V_{out}$, which controls enable signal generator 160, as explained above. If the RMS value of $V_{out}$ decreases, the error voltage $V_e$ (shown in FIG. 2 and timing diagram 302) increases. Comparator 164 compares $V_e$ to triangular wave $V_T$ (shown in FIG. 2 and timing diagram 302) and causes the width of the 100 Hz envelope of $G_1$, $G_2$ to increase. In the meantime, the width of the 100 Hz envelope of $G_3$ decreases relatively. As a result, a 100 Hz trapezoidal voltage wave with a controllable duty cycle is produced at capacitor 40.

Output RMS regulation is maintained by varying this conduction time (i.e., the widths of the $G_1$, $G_2$ envelope and the $G_3$ envelope) not by regulating the peak of the $V_{out}$ trapezoidal wave. Indeed, the peak of the output voltage will tend to decrease as the battery voltage decreases. In such cases, the conduction time will be increased to maintain RMS regulation.

Timing diagrams 300, 304 and 306 are self-explanatory. Timing diagram 300 Simply shows the 100 Hz CLK2 signal. Timing diagram 304 shows $V_c$. Timing diagram 306 shows $V_{ref}$, whose rising edge slope defines the soft-start rising edge of $V_{out}$ in each 100 Hz cycle.

When used as an off-line UPS, electrical power inverter 10 has additional useful functions. In such a case, load port 22 is coupled to the same AC line voltage as the load being served by the UPS. When the AC line voltage fails, electrical power from inverter 10 supplies power to the load. When AC line power exists on port 22, however, capacitor 40 will be peak charged by the AC line voltage through the body diodes of switches 96–102. In such a case, when switch 78 is on, it causes current to be conducted from capacitor 40 through winding 66, in the same manner as described above. Transformer 90, comprising winding 66 and winding 92, then acts as a flyback transformer and couples power to capacitor 24 and battery 18. Thus, this circuit also acts as a flyback charger, taking power from capacitor 40 and providing charging power to battery 18. There is no need to add any additional power component to perform this battery charging function.

Figure 4:
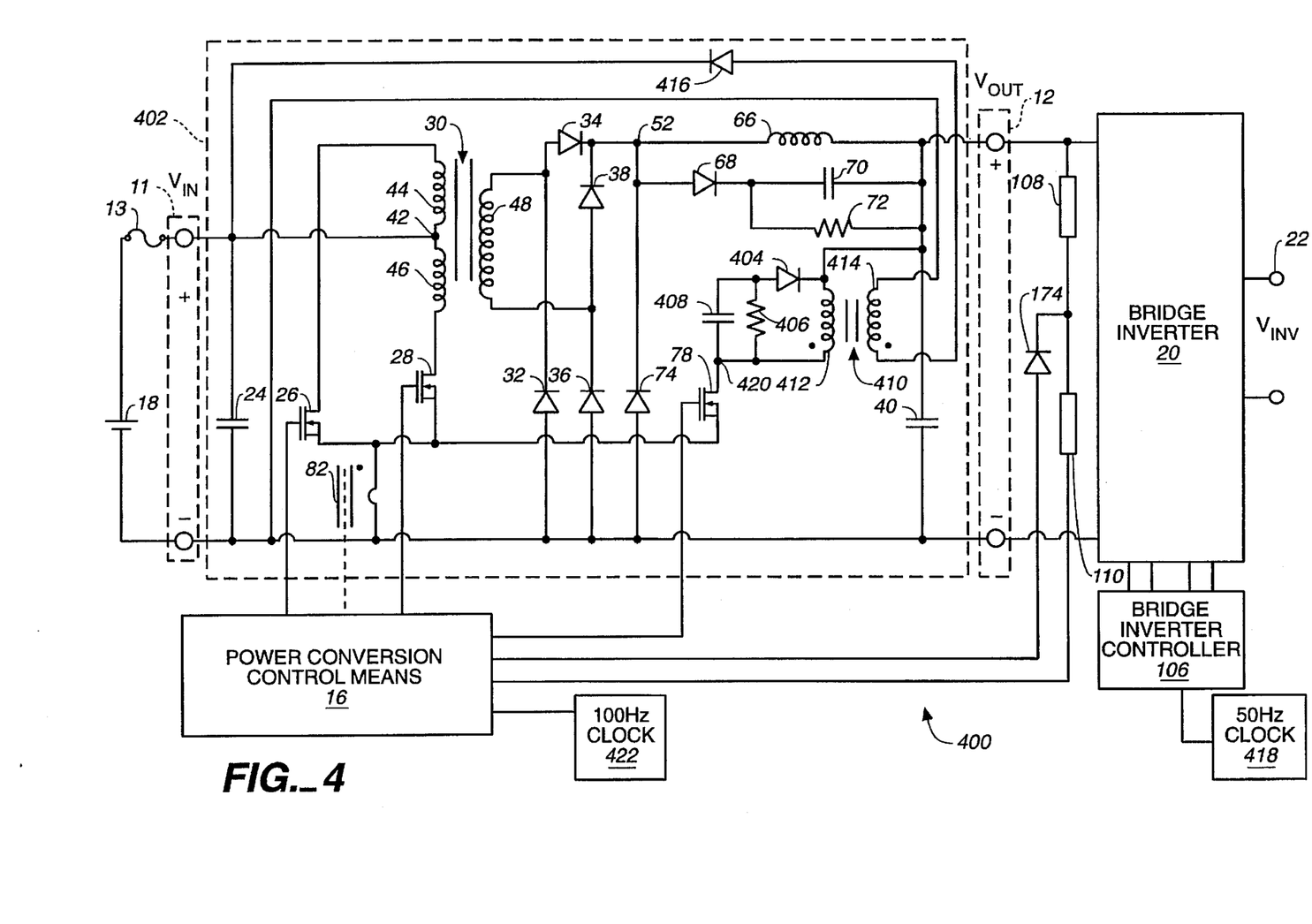
FIG. 4 shows an alternative embodiment of an electrical power converter according to the present invention.

An alternative embodiment of an electrical power inverter according to the present invention is shown at 400 in FIG. 4. Many elements of electrical power inverter 400 are similar in function to elements already described in connection with electrical power converter 10 shown in FIG. 2. The numbering of such elements corresponds to their numbering in FIG. 2. The function of such elements is described in connection with FIG. 2 and will not be repeated herein.

Power conversion means 402 of electrical power inverter 400, while performing an analogous function, differs somewhat from power conversion means 14 of electrical power inverter 10. The differences exist on the secondary side of power transformer 30, primarily in the secondary circuit that is coupled to secondary winding 48. In this embodiment of the secondary circuit, several of the elements described in connection with FIG. 2 have been eliminated or replaced. The elements which have been eliminated are not shown. The new elements include a rectifier 404, a resistor 406, a capacitor 408, a transformer 410, having a primary winding 412 and a secondary winding 414, a rectifier 416, and a 50 Hz clock 418.

In power conversion means 402, rather than being connected through rectifier 76 to node 52, switch 78 is coupled to a node 420. Primary winding 412 of transformer 410 is coupled between a node 420 and the positive terminal of output port 12. Rectifier 404 is coupled in series with the parallel combination of capacitor 408 and resistor 406 between node 420 and the positive terminal of output port 12 and is oriented such that electrical current can flow through only in the direction towards output port 12. One end of secondary winding 414 is coupled through rectifier 416 to the positive terminal of input port 11 and the other end of secondary winding 141 is coupled to the negative terminal of input port 11.

Transformer 410 acts as a flyback transformer to discharge capacitor 40 and as a charging transformer to charge battery 18. As described in connection with FIG. 2, capacitor 40 is discharged when switch 78 is closed. In power conversion means 402, however, capacitor 40 is discharged through primary winding 412 rather than through winding 66. During discharge, magnetic energy builds up in the core of transformer 410, which energy is discharged after switch 78 opens through secondary winding 414 and rectifier 416 to input port 11. In a preferred embodiment, an EE 19 ferrite core is used in transformer 410. Resistor 406, capacitor 408 and rectifier 404 comprise a conventional snubber/clamper circuit. By using a separate inductor rather than a transformer that includes winding 66, the magnetic design can be optimized for the separate functions performed by each of these components. This design also prevents any energy from flowing back to input capacitor 24 when capacitor 40 is being charged by the push-pull action of switches 26 and 28.

In electrical power inverter 400, bridge inverter controller 106 is coupled to 50 Hz clock 418, rather than to 100 Hz clock 422 which is coupled only to power conversion control means 16. The 50 Hz clock 418 and 100 Hz clock 422 are locked together in a conventional manner.

For 250 V off-line UPS with 230 Vrms trapezoidal output using the circuit shown in FIG. 4, the following exemplary component values may be used (other components having values similar to those shown in connection with FIG. 2).

| ITEM | COMPONENT DESCRIPTION AND VALUE |
| --- | --- |
| Capacitor 24 | |
| Capacitors 70, 408 | Ceramic capacitor 2.2nF 500V |
| Rectifier 404 | Ultra Fast Recovery Rect. 1A 800V |
| Rectifier 74 | Ultra Fast Recovery Rect. 2.3A 600V |
| Rectifier 416 | Ultra Fast Recovery Rect. 2.3A 100V |
| Switches 26 and 28 | MOSFET 35A 50V |
| Resistors 108, 110 | Res. 56K 2W |
| Fuse 13 | DC fuse 32V 30A |
| Transformer 410 | Ferrite core transformer EE19 |

It will be recognized based on the present disclosure that the power conversion means and control circuitry shown in FIGS. 2 and 4 of the present invention operate as an electrical power converter that can be used, in the absence of bridge inverter 20, as a power converter having a trapezoidal output voltage.

While the present invention has been particularly described with respect to the illustrated embodiments, it will be appreciated that various alterations, modifications, and adaptations may be made based on the present disclosure, and are intended to be within the scope of the present invention. While the invention has been described in connection with what is presently considered to be the most practical and preferred embodiments, it is to be understood that the present invention is not limited to the disclosed embodiments but, to the contrary, is intended to cover various modifications and equivalent arrangements included within the scope of the appended claims.

What is claimed is:

1. An electrical power converter for generating an output voltage from an input DC voltage, said output voltage having a periodic substantially trapezoidal waveform shape, comprising:

an input port for receiving a DC voltage source and an output port for providing said trapezoidal wave output voltage to a load;

a power conversion means for generating said trapezoidal wave output voltage at said output port from said input voltage, said power conversion means having an energy storage means coupled to said output port for storing energy at said output port and for generating said output voltage as a function of the amount of said stored energy, and an energy coupling means for coupling energy from said input port to said output port in amounts needed to supply energy to the load and to enable said energy storage means to generate said trapezoidal wave output voltage; and a power conversion control means for causing said output voltage to vary at a selected output frequency, wherein said output voltage periodically increases from a value of substantially zero volts to a selected voltage, remains substantially at said selected voltage for a controlled period of time, and subsequently decreases to a value of substantially zero volts, said power conversion control means including a voltage increase control means for controlling the rate at which energy is coupled to said output port such that the rate of said increase in said output voltage is maintained below a selected value.

2. The electrical power converter of claim 1 wherein said DC voltage source comprises a battery.

3. The electrical power converter of claim 1 wherein said energy storage means comprises a capacitor.

4. The electrical power converter of claim 3 wherein said output port includes a first terminal and a second terminal and wherein said energy coupling means comprises:

a node;

a first inductor coupled between said node and the first terminal of said output port;

means for selectively coupling electrical energy from said input port to said node at a switching frequency substantially greater than said selected output frequency, said means for selectively coupling electrical energy having a first periodic state in which electrical energy is coupled to said node and a second periodic state in which electrical energy is substantially prevented from coupling to said node, said capacitor being charged up during said first state, and wherein the duration of said first state is responsive to said output voltage; and a secondary switch coupled between said node and the second terminal of said output port for discharging the energy stored in said capacitor during said second state.

5. The electrical power converter of claim 4 further comprising a voltage decrease control means for controlling the rate at which energy is discharged from said capacitor such that the rate of decrease of said output voltage is controlled.

6. The electrical power converter of claim 5 wherein said voltage decrease control means comprises a current limiter which detects the amount of current flowing through said secondary switch and controls the on time of said secondary switch so as to control the slope of the falling edge of said trapezoidal wave output voltage.

7. The electrical power converter of claim 4 wherein said means for selectively coupling electrical energy comprises:

a transformer having a first primary winding and a second primary winding each coupled to said input port and at least one secondary winding coupled to said node;

a first primary switch coupled to said first primary winding for alternately enabling electrical energy to couple from said input port to said first primary winding at a first primary switching frequency substantially greater than said output frequency, and a second primary switch for alternately enabling electrical energy to couple from said input port to said second primary winding at a second primary switching frequency substantially greater than said output frequency, said first and second primary switches each having ON states in which electrical energy is enabled to couple to said first and second primary windings, respectively, and OFF states in which electrical energy is substantially prevented from coupling to said first and second primary windings, respectively, wherein said first primary switch and said second primary switch are not in their respective ON states at the same time;

a rectifying circuit coupled to said secondary winding such that electrical energy is enabled to couple substantially only in the direction from said secondary winding to said node.

8. The electrical power converter of claim 4 wherein said voltage increase control means comprises a soft start means operative at the beginning of each said first state, said soft start means including an error amplifier having first and second inputs, said first input being fed by a voltage representative of said output voltage and said second input being fed by a soft start reference voltage which rises from a relatively low value to a selected reference voltage at the beginning of each said first state, said error amplifier generating a soft start control signal;

a comparator means having two inputs, the first said input having said soft start control signal coupled thereto and said second input having a high-frequency clock pulse coupled thereto, the output of said comparator means controlling the amount of energy coupled by said energy coupling means from said input port to said output port.

9. The electrical power converter of claim 8, wherein said soft start reference voltage comprises a fixed reference voltage, a resistor coupled to said reference voltage, and a second capacitor coupled to said resistor, such that, at the beginning of each said first state, current is coupled through said resistor to said second capacitor so as to cause the voltage on said second capacitor to rise at a rate defined by the value of said capacitor and said resistor until said voltage reaches the voltage of said fixed reference voltage, the voltage across said capacitor comprising said soft start reference voltage; and means for discharging said second capacitor prior to the beginning of each said first state.

10. The electrical power converter of claim 4 wherein the duration of said first state is a function of the RMS value of said output voltage.

11. The electrical power converter of claim 1, wherein said selected value of said rate of increase is approximately ten volts per microsecond.

12. The electrical power converter of claim 1, further comprising a voltage decrease control means for controlling the rate at which energy is removed from said energy storage means such that the rate of decrease of said output voltage is controlled.

13. The electrical power converter of claim 12, wherein said voltage decrease control means comprises a current limiter which detects the amount of current flowing through said secondary switch and controls the on time of said secondary switch so as to control the slope of the falling edge of said trapezoidal wave output voltage.

14. The electrical power converter of claim 13, wherein said current limiter includes a current sensing resistor whose effective resistance is caused to go up to cause the mount of current flowing through said secondary switch to ramp down at a controlled rate to thereby control the slope of the falling edge of said trapezoidal wave output voltage.

15. The electrical power converter of claim 1, further comprising a bridge inverter coupled between said output port and said load for causing said output voltage to be inverted during alternate voltage cycles of said output voltage waveform.

16. The electrical power converter of claim 1, wherein said selected output frequency is approximately 100 Hz.

17. The electrical power converter of claim 4, wherein said switching frequency is approximately 100 kHz.

18. An electrical power inverter, comprising:

an input port for receiving a source of electrical energy having a DC input voltage and an output port for providing electrical energy to a load;

a power conversion means for generating an output voltage at said output port from said input voltage, said power conversion means having a capacitor coupled to said output port for storing energy at said output port and for generating said output voltage as a function of the amount of said stored energy, and an energy coupling means for coupling energy from said input port to said output port in amounts needed to supply energy to the load and to enable said capacitor to generate said output voltage;

a power conversion control means for causing said output voltage to have a substantially trapezoidal output voltage waveform that periodically increases from a value of substantially zero volts to a selected voltage, remains substantially at said selected voltage for a controlled period of time and subsequently decreases to a value of substantially zero volts at a selected output frequency;

a voltage increase control means for controlling the rate at which energy is coupled to said output port, said voltage increase control means preventing said output voltage from increasing faster than a selected rate of increase; and a bridge inverter coupled between said output port and said load such that said output voltage is inverted during alternate voltage cycles of said output voltage waveform.

19. The electrical power inverter of claim 18 wherein said source of electrical energy comprises a battery and wherein said electrical power inverter is used as an off-line UPS for providing an AC power source when the normal AC power coupled to the load at the output of said power inverter is removed.

20. The electrical power inverter of claim 19 further comprising an energy return means for selectively coupling energy from said output port to said input port and thereby to said battery when said normal AC power is coupled to said load.

21. The electrical power converter of claim 20 wherein said energy return means comprises a second inductor magnetically coupled to said first inductor, said second inductor being coupled to said input port and a return rectifier coupled to said second inductor such that electrical energy is enabled to couple through said second inductor substantially only in the direction from said second inductor to said input port;

and wherein said secondary switch is further for alternately enabling electrical energy to be coupled from said output port, when said normal AC power is coupled to said load, through said first inductor at a secondary switching frequency substantially greater than said reference frequency, said secondary switch having an ON state in which electrical energy is enabled to couple from said output port through said first inductor and an OFF state in which electrical energy is substantially prevented from coupling from said output port through said first inductor, wherein the duration of the ON state of said secondary switch is controlled by said control means such that said means for selectively coupling electrical energy is not in its first state at the same time said commutating switch means is in its ON state.

* * * * *